(No Model.)
W. MILLSPAUGH.
HAND CHOPPING KNIFE.
No. 319,294. Patented June 2, 1885.
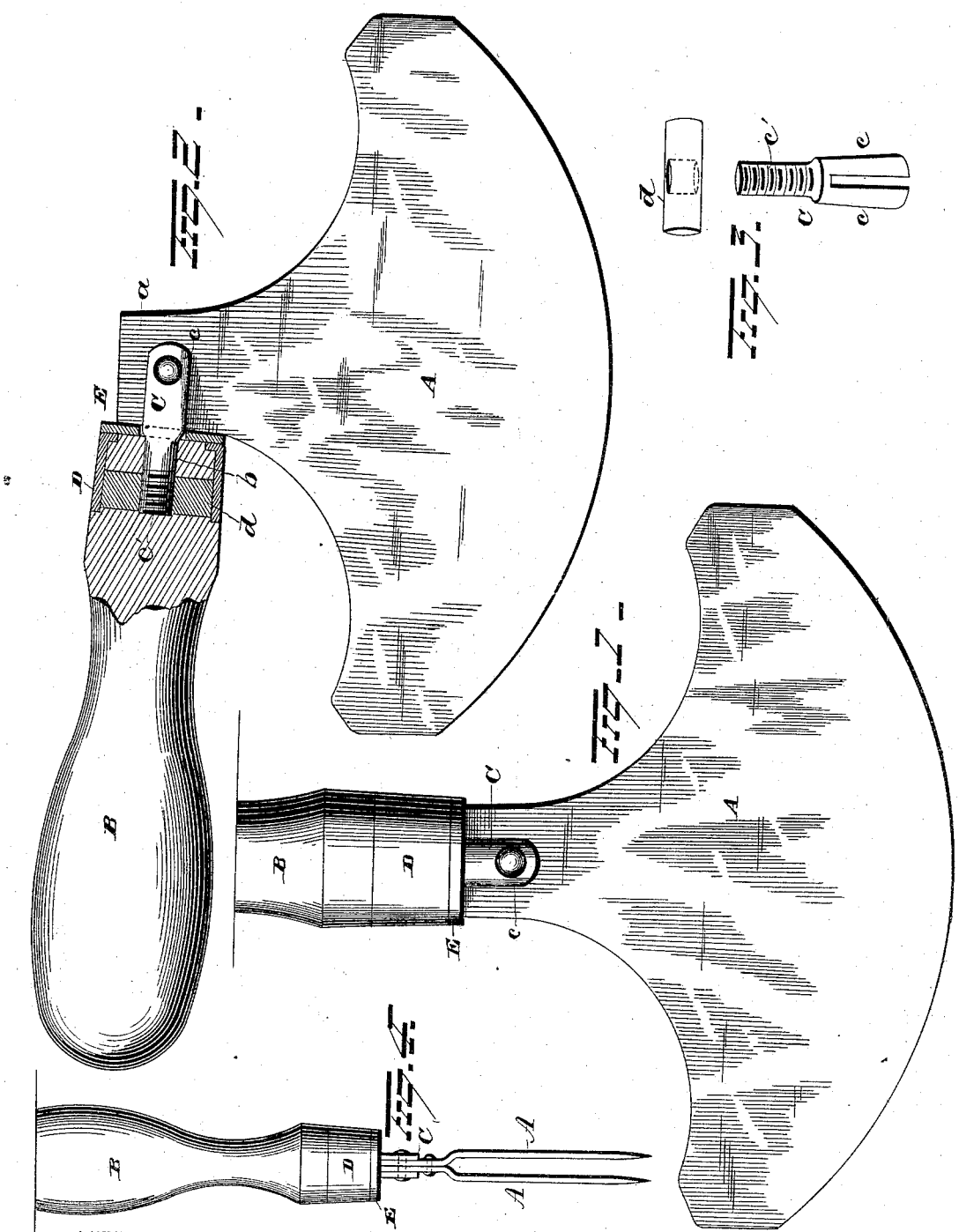
WITNESSES
INVENTOR
ATTORNEY

UNITED STATES PATENT OFFICE.

WILLIAM MILLSPAUGH, OF MIDDLETOWN, NEW YORK.

HAND CHOPPING-KNIFE.

SPECIFICATION forming part of Letters Patent No. 319,294, dated June 2, 1885.

Application filed September 18, 1884. (No model.)

*To all whom it may concern:*

Be it known that I, WILLIAM MILLSPAUGH, of Middletown, in the county of Orange and State of New York, have invented certain new and useful Improvements in Hand Chopping-Knives; and I do hereby declare the following to be a full, clear, and exact description of the invention, such as will enable others skilled in the art to which it appertains to make and use the same.

My invention relates to an improvement in hand chopping-knives, the object of the same being to provide a knife in which the handle is attached to the blade or blades in such a manner that it may be readily and firmly adjusted in different positions with respect to the blade, and thereby be adapted for use as both an up and down chopper and a cleaver.
With these ends in view my invention consists in a blade or blades pivotally secured to a handle, and means for locking the same to the handle in different adjustments.

My invention further consists in certain features of construction and combinations of parts, as will be hereinafter described, and pointed out in the claim.

In the accompanying drawings, Figure 1 is a view of the knife with handle upright. Fig. 2 is a view of the knife with handle horizontal, partly in section, and Fig. 3 is a detached view of the adjusting-bolt. Fig. 4 is a modification.

A represents the blade or blades, and B the handle. The blade A is shaped quite similar to those in common use, the cutting-edge being convex, and the upper portion drawn in to form the tang $a$. Instead, however, of the tang being drawn out or shaped to enter the handle, as is customary, it is cut off squarely at the point where it would naturally enter the handle, and provided with a separate section or bolt, C, adapted to enter the handle. The section C is bifurcated at one end, and the upper end of the tang $a$ is pivotally secured between the branches $c$. The opposite end of C is provided with a male thread, $c'$.

The handle B is provided with a longitudinal perforation, $b$, adapted to receive the tang-section C and allow the same a free longitudinal movement therein. About midway between the upper and lower ends of the ferrule D the handle is perforated transversely to admit a stationary nut, $d$, adapted to engage the threaded end of the section C.

When the nut is inserted and the ferrule placed in position on the handle, the nut is securely locked within the handle, and the whole presents a neat appearance and is firm and durable.

A loose washer, E, preferably of hard metal, is placed on the section C between the handle and the squared end of the tang $a$.

By swinging the handle into an upright position with respect to the blade and rotating the handle to the right the nut $d$ draws the end of the tang $a$ into snug contact with the washer E, and the blade is thereby locked firmly to the handle for use.

When it is desired to change the handle into a position at or nearly at right angles to the tang $a$, the handle is turned to the left until there is sufficient play between the ferrule and the end of tang $a$ to allow the blade to swing on its pivot between the branches $c$, when the handle is again rotated to the right and the ferrule and tang $a$ drawn up snugly to the washer E, thereby locking the blade snugly in the position shown in Fig. 2. By this simple adjustment of the handle and blade the operator may change from time to time the motion of chopping, and thereby be relieved from the fatigue which attends the continued use of a single set of muscles. It will be observed, furthermore, that there is in the above-described knife no waste of metal in accomplishing the desired end—an objection noticeable in the construction of the circular blade hitherto constructed.

In the construction shown in Fig. 4 the tangs of two similar blades, A, are bent toward each other and united, forming a double blade. A third blade having a straight tang might be inserted between these two last-mentioned blades, thus forming a three-bladed chopper.

It is evident that the construction herein set forth may be modified in several particulars without departing from the spirit and scope of my invention. For example, the ferrule might be provided with a metal head and the loose washer omitted, or the lower edge of the common ferrule might be constructed to come in direct contact with the tang *a* and the washer be omitted. Again, the end of the tang *a* is not necessarily squared, as shown, but may be shouldered, or concave or corrugated, and other slight changes might be made in the forms of the several parts; hence I do not wish to limit myself strictly to the construction herein set forth.

I am aware that it is not new to provide a hatchet or an ax with a semicircular head and pivot a handle to said head by a transverse pivot, whereby the ax may be adjusted in the plane of the axis of said handle. I am also aware that it is old to pivot a screw-bolt to a saw-blade in such a position as to enable it to be turned either at right angles to or in a line with the blade and secure a handle having a nut therein and secured to said screw-bolt, whereby by turning the handle in one direction the latter can be loosened for moving it to another position, and by turning it in the opposite direction can be locked to the saw-blade; hence I make no claim, broadly, to these constructions; but, Having fully described my invention, what I claim as new, and desire to secure by Letters Patent, is—

The combination, with a blade provided with a tang having its back and side or sides formed of straight edges, of a handle having a nut secured therein, a bifurcated bolt pivoted to the tang so that the latter may be partly rotated thereon, said bolt having a screw-threaded shank that engages the nut in the handle, and a smooth flat metal bearing on the end of the handle and adapted to be forced snugly against the back or side edges of the blade, substantially as set forth.

In testimony whereof I have signed this specification in the presence of two subscribing witnesses.

WILLIAM MILLSPAUGH.

Witnesses:
FRANK B. HATHAWAY,
ALBERT H. LOEBS.